US012649290B2

(12) United States Patent
Lexilus et al.

(10) Patent No.: US 12,649,290 B2
(45) Date of Patent: Jun. 9, 2026

(54) AERONAUTICAL CASING PREFORM COMPRISING A FIBROUS WEB WITH TWO DEPLOYABLE PORTIONS

(71) Applicant: SAFRAN AIRCRAFT ENGINES, Paris (FR)

(72) Inventors: Jean-Hilaire Lexilus, Moissy-Cramayel (FR); Clément Bourolleau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 19/128,767

(22) PCT Filed: Nov. 8, 2023

(86) PCT No.: PCT/FR2023/051756
§ 371 (c)(1),
(2) Date: May 9, 2025

(87) PCT Pub. No.: WO2024/100361
PCT Pub. Date: May 16, 2024

(65) Prior Publication Data
US 2026/0008241 A1 Jan. 8, 2026

(30) Foreign Application Priority Data
Nov. 10, 2022 (FR) ...................................... 2211763

(51) Int. Cl.
*B29C 70/24* (2006.01)
*B29K 105/08* (2006.01)
(Continued)

(52) U.S. Cl.
CPC ........ *B29C 70/24* (2013.01); *B29K 2105/089* (2013.01); *B29K 2307/04* (2013.01);
(Continued)

(58) Field of Classification Search
CPC .............. B29C 70/24; B29K 2105/089; B29K 2307/04; B29K 2995/0077; B29K 2995/0097; B29L 2031/3076
(Continued)

(56) References Cited

U.S. PATENT DOCUMENTS

| | | | |
|---|---|---|---|
| 6,446,675 | B1 | 9/2002 | Goering |
| 2006/0121809 | A1 | 6/2006 | Goering |

(Continued)

FOREIGN PATENT DOCUMENTS

| | | |
|---|---|---|
| EP | 2 715 072 A1 | 4/2014 |
| EP | 2 802 702 A2 | 11/2014 |

(Continued)

OTHER PUBLICATIONS

International Preliminary Report on Patentability and the Written Opinion of the International Searching Authority as issued in International Patent Application No. PCT/FR2023/051756, dated Apr. 29, 2025.

(Continued)

*Primary Examiner* — Travis M Figg
(74) *Attorney, Agent, or Firm* — CUSHMAN PARTNERS, LLC

(57) ABSTRACT

A fibrous web extending between a proximal edge and a distal edge, between a first side edge and a second side edge, and between an inner face and an outer face, the fibrous web including a distal portion present between an intermediate part and the distal edge in the longitudinal direction, the distal portion including, in the direction of its thickness, an inner portion and an outer portion, wherein the outer portion is connected to the inner portion by at least one linking portion, the outer portion comprising a first deployable portion separated from the inner portion by a first non- (Continued)

interlinked area, and a second deployable portion separated from the inner portion by a second non-interlinked area.

11 Claims, 7 Drawing Sheets

(51) Int. Cl.
    *B29K 307/04*     (2006.01)
    *B29L 31/30*     (2006.01)
(52) U.S. Cl.
    CPC ................. *B29K 2995/0077* (2013.01); *B29K 2995/0097* (2013.01); *B29L 2031/3076* (2013.01)
(58) Field of Classification Search
    USPC ........................................................ 428/213
    See application file for complete search history.

(56) References Cited

U.S. PATENT DOCUMENTS

| | | | | |
|---|---|---|---|---|
| 2014/0363299 | A1* | 12/2014 | Marchal | D03D 25/005 |
| | | | | 264/258 |
| 2017/0011152 | A1* | 1/2017 | Barreau | B29B 11/16 |
| 2017/0198420 | A1* | 7/2017 | Hellot | B29C 70/32 |
| 2017/0266893 | A1* | 9/2017 | Marin | B29C 70/24 |
| 2018/0339468 | A1* | 11/2018 | Hellot | D03D 3/06 |
| 2019/0030840 | A1* | 1/2019 | Camus | F02C 7/04 |
| 2019/0061202 | A1* | 2/2019 | Fabre | B29B 11/16 |
| 2019/0072003 | A1* | 3/2019 | Zaccardi | F01D 25/24 |
| 2019/0160765 | A1* | 5/2019 | Le Hong | B29C 70/462 |
| 2020/0190711 | A1* | 6/2020 | Le Hong | B29B 11/16 |
| 2020/0271015 | A1* | 8/2020 | Fabre | B32B 1/00 |
| 2021/0164364 | A1* | 6/2021 | Grelin | D03D 15/267 |
| 2021/0340881 | A1* | 11/2021 | Bourolleau | B29C 70/24 |
| 2022/0120196 | A1* | 4/2022 | Bourolleau | D03D 41/004 |
| 2022/0228490 | A1* | 7/2022 | Fixy | F01D 5/147 |
| 2022/0250338 | A1* | 8/2022 | Fromonteil | B29C 70/24 |

FOREIGN PATENT DOCUMENTS

| | | | |
|---|---|---|---|
| EP | 2 715 072 | B1 | 4/2015 |
| EP | 2 802 702 | B1 | 12/2018 |
| FR | 3 055 624 | A1 | 3/2018 |
| WO | WO 2012/164204 | A1 | 12/2012 |
| WO | WO 2013/088041 | A2 | 6/2013 |
| WO | WO 2013/104853 | A2 | 7/2013 |

OTHER PUBLICATIONS

International Search Report as issued in International Patent Application No. PCT/FR2023/051756, dated Mar. 4, 2024.

* cited by examiner

[Fig. 1]
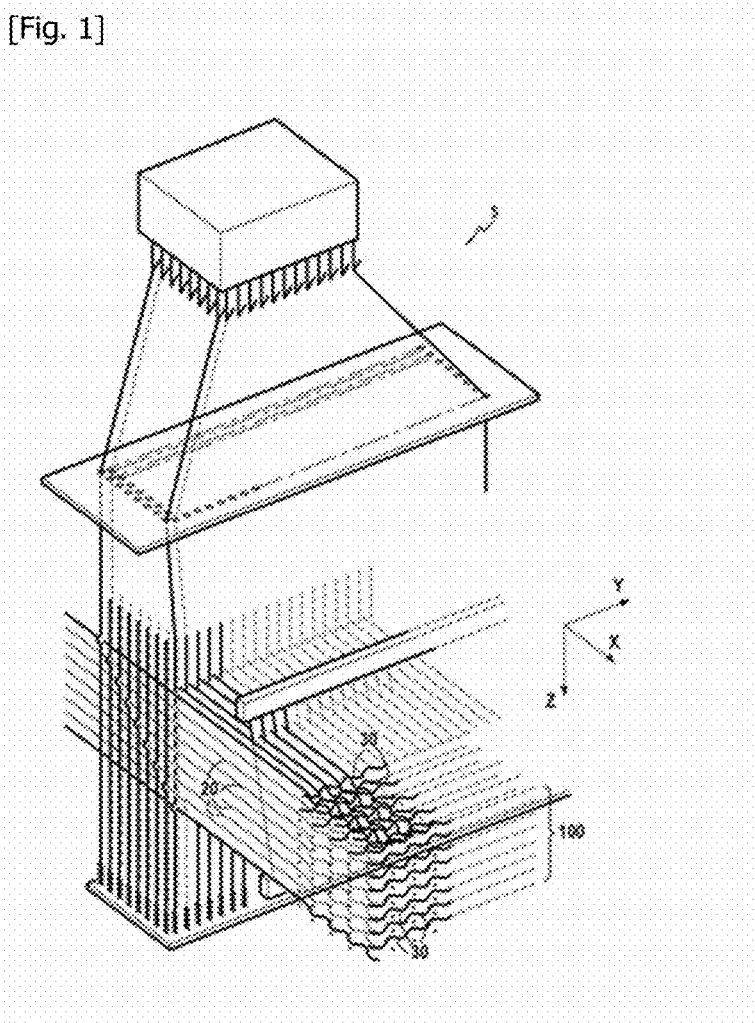
[Fig. 2]
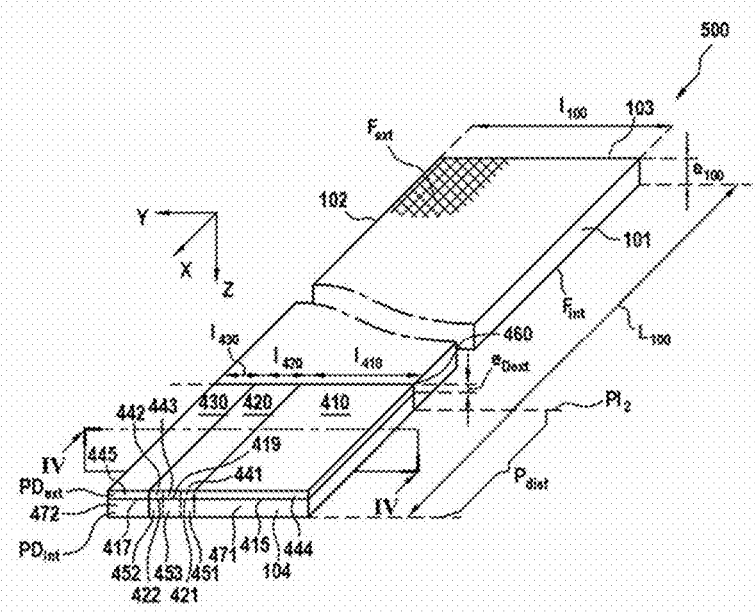

[Fig. 3]
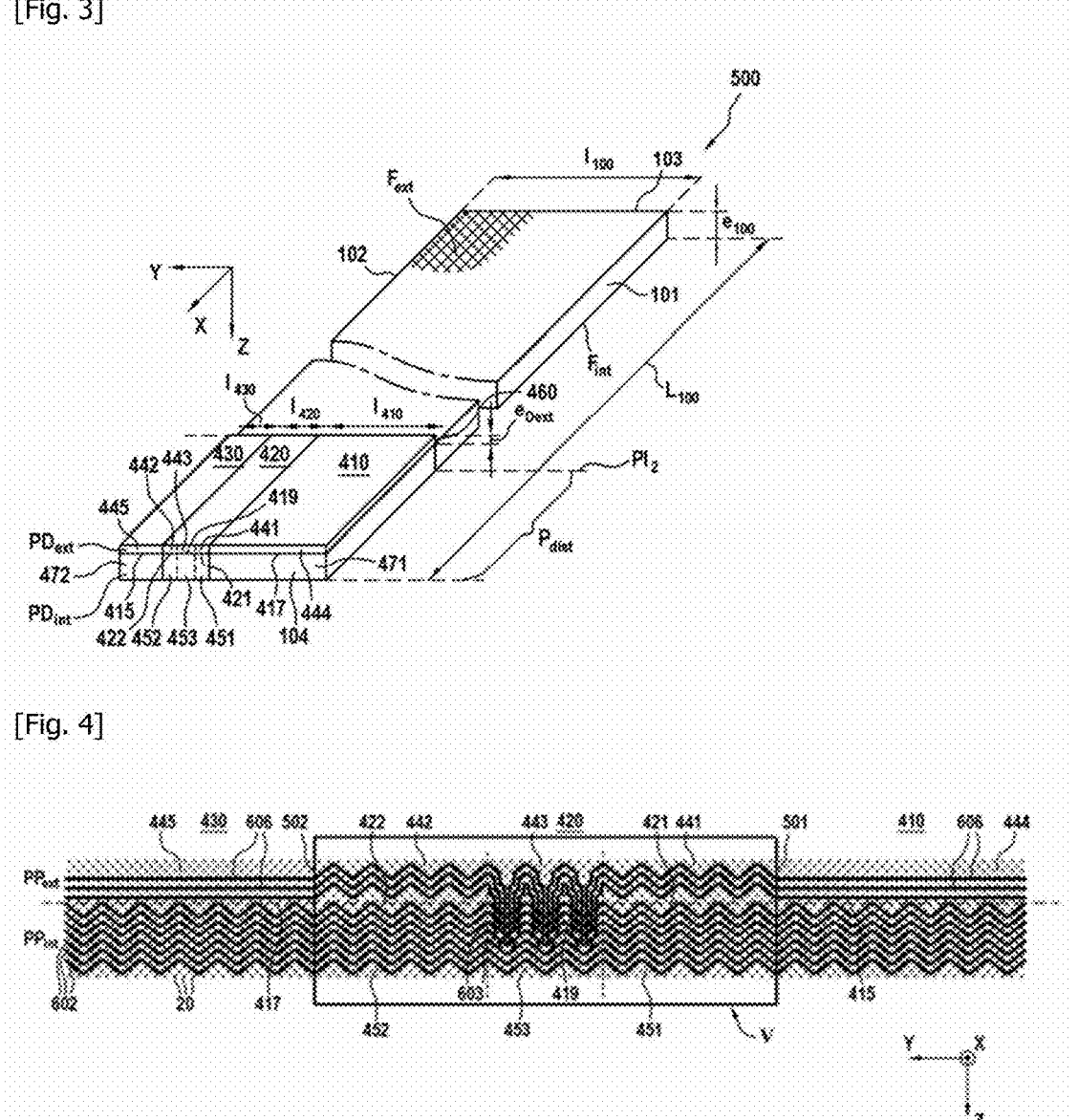
[Fig. 4]

[Fig. 5]
[Fig. 6]
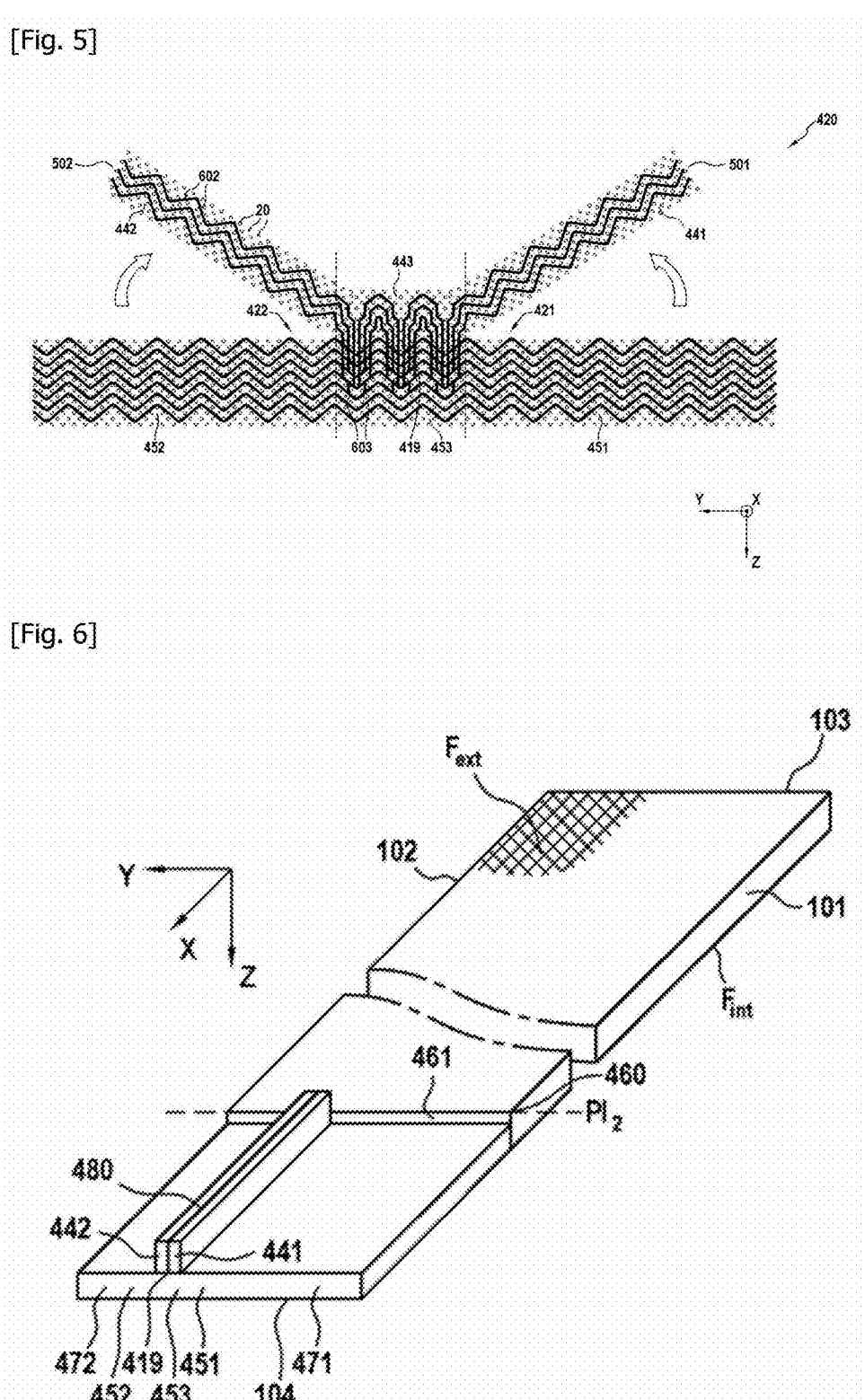

[Fig. 7]
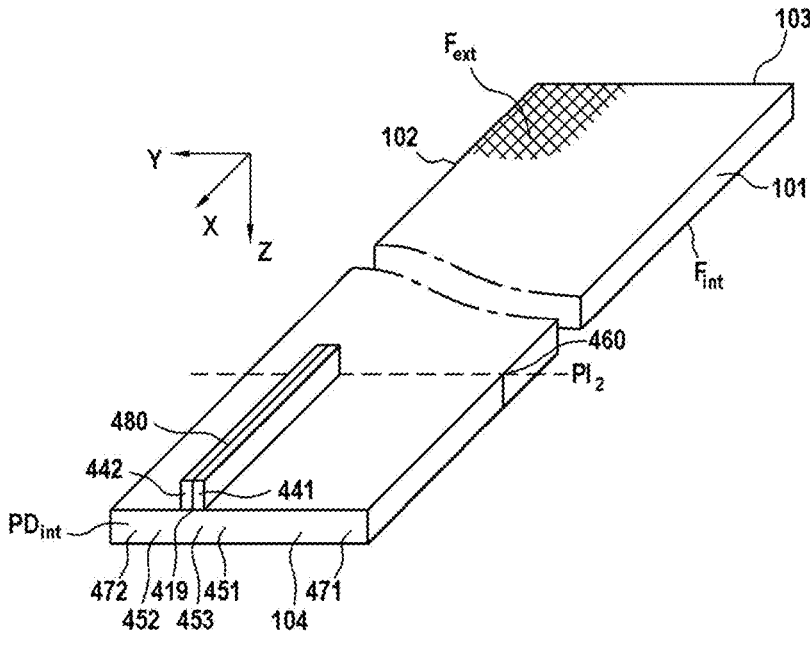
[Fig. 8]
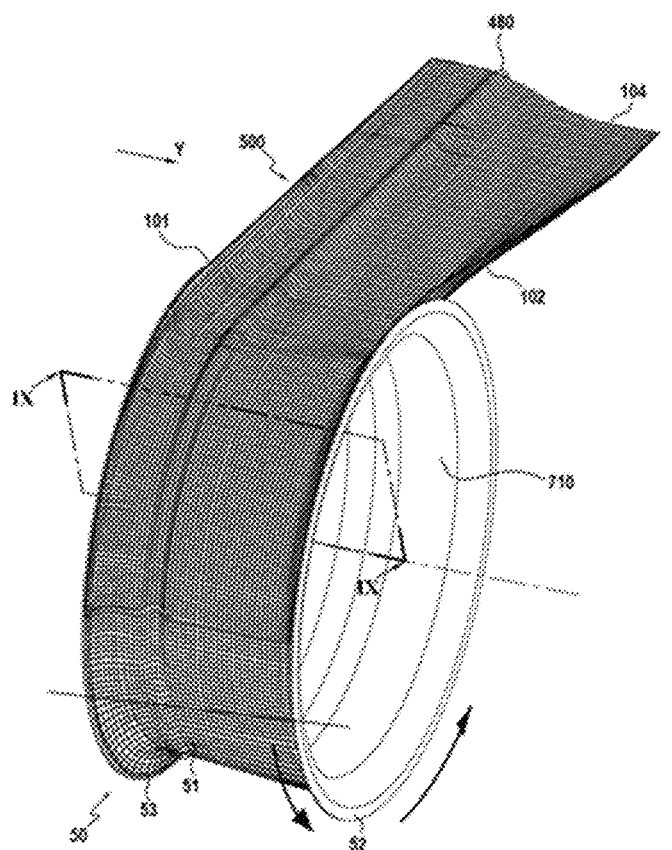

[Fig. 9]
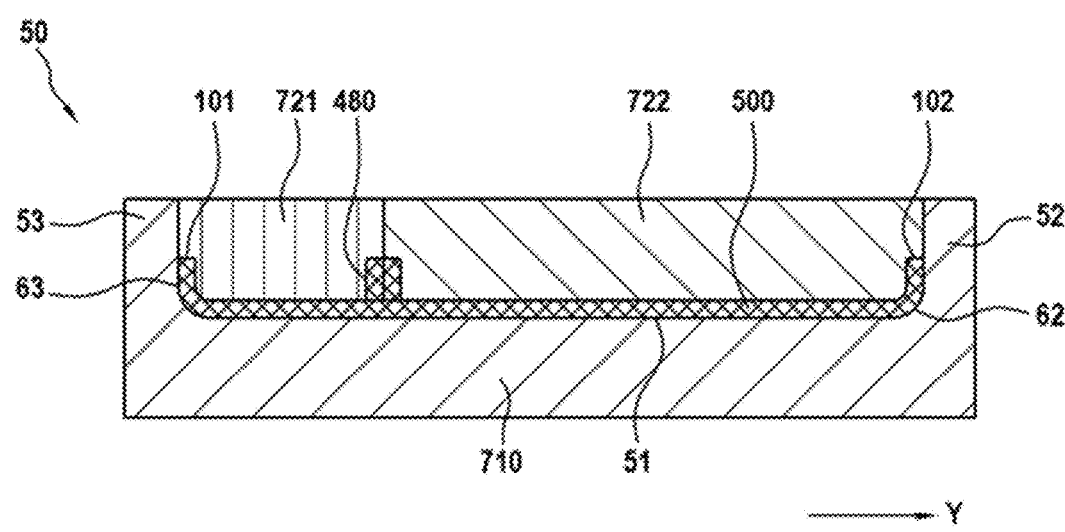
[Fig. 10]
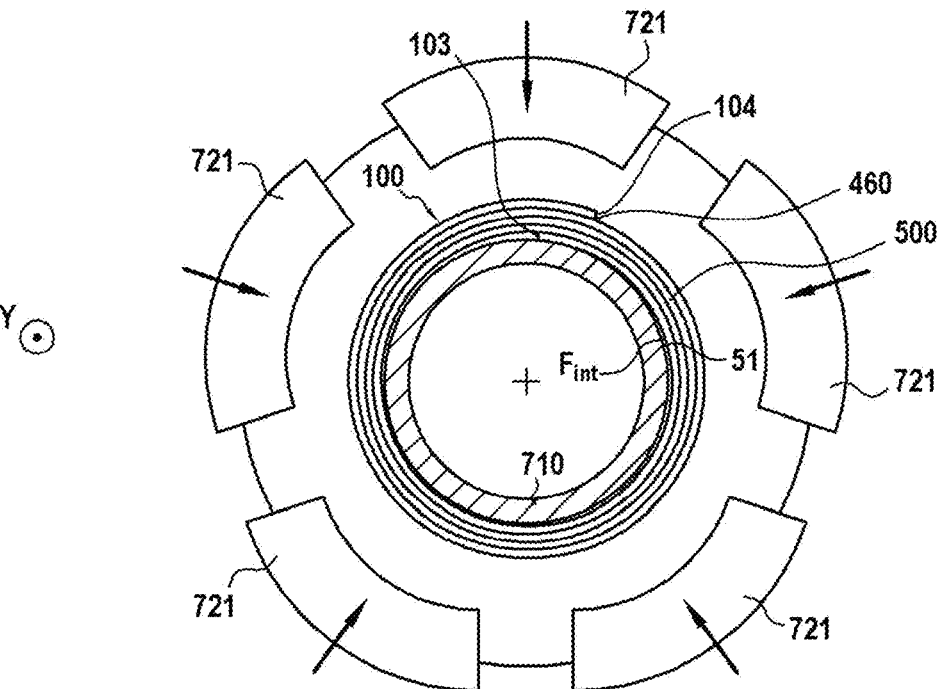

[Fig. 11]
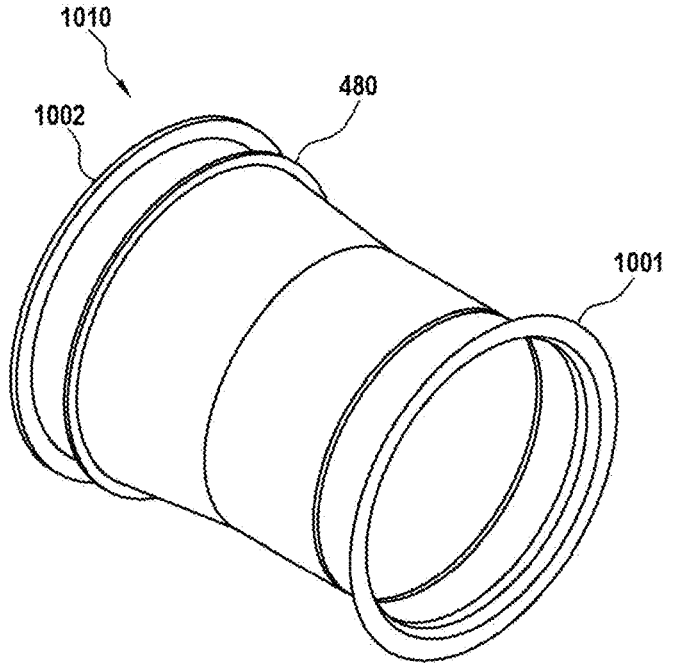
[Fig. 12]
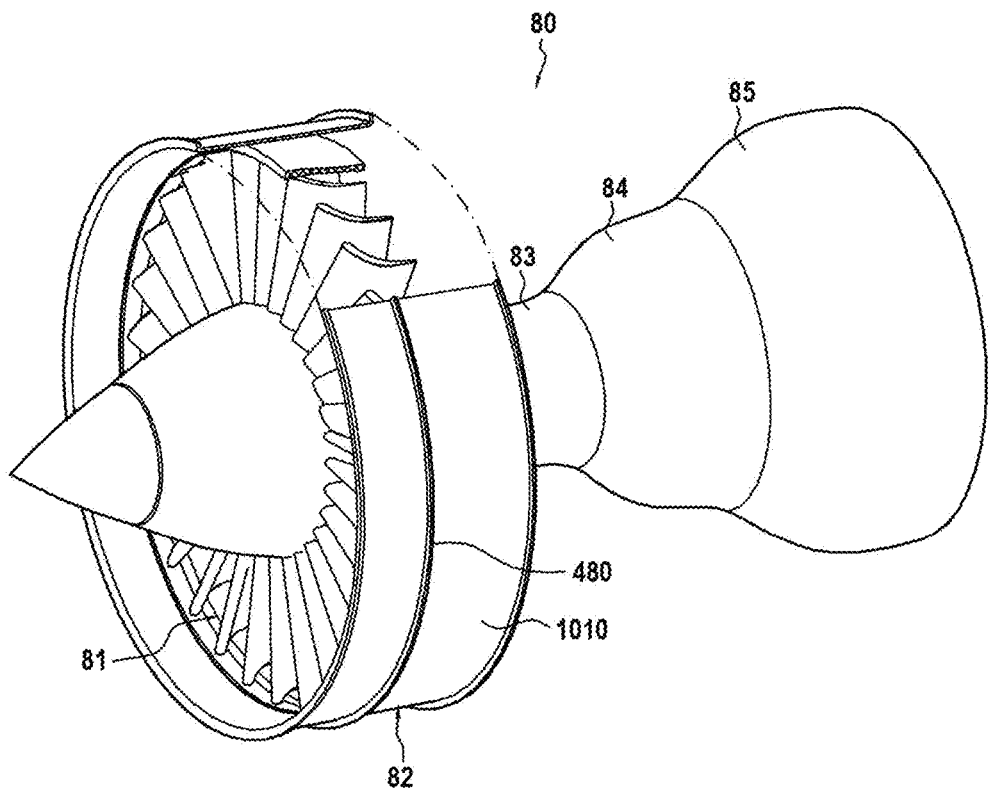

[Fig. 13]
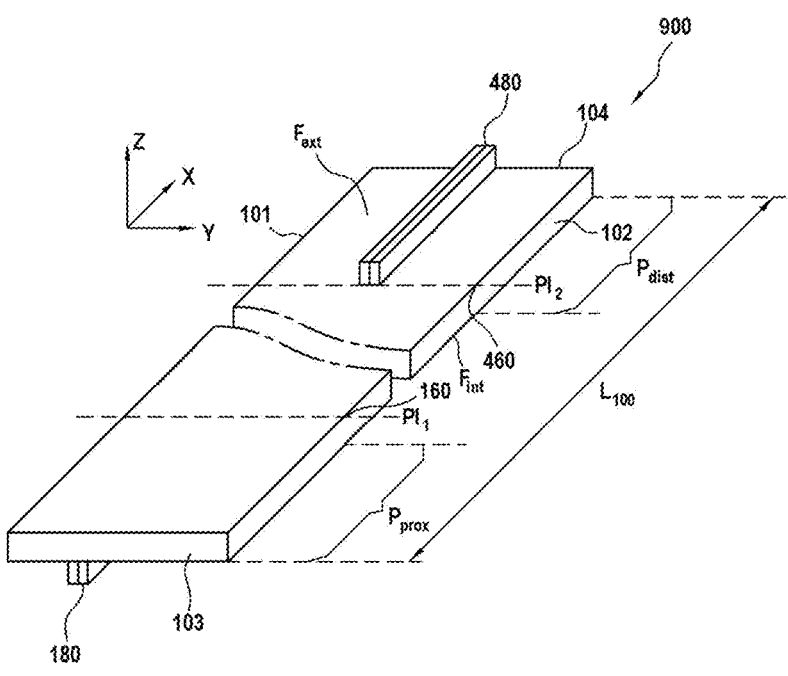
[Fig. 14]
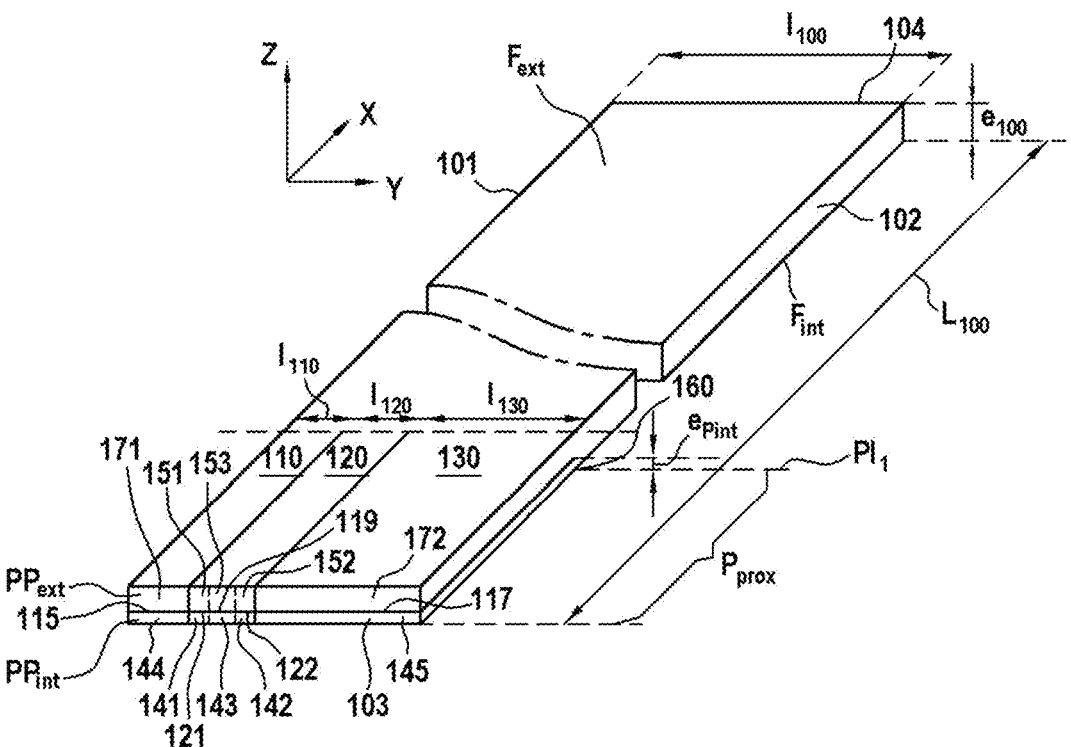

AERONAUTICAL CASING PREFORM COMPRISING A FIBROUS WEB WITH TWO DEPLOYABLE PORTIONS

CROSS-REFERENCE TO RELATED APPLICATIONS

This application is the U.S. National Stage of PCT/FR2023/051756, filed Nov. 8, 2023, which in turn claims priority to French patent application number 2211763 filed Nov. 10, 2022. The content of these applications are incorporated herein by reference in their entireties.

TECHNICAL FIELD

The present invention relates to a method for manufacturing a fibrous web which can be used, in particular but not exclusively, to form the fibrous reinforcement of an aeronautical engine fan casing made of composite material.

PRIOR ART

The manufacture of a composite material casing starts with the production of a strip-shaped fibrous web, the fibrous web being produced by three-dimensional weaving between a plurality of layers of warp yarns and a plurality of layers of weft yarns. The fibrous web thus obtained is wound over a plurality of turns on a mould or a tooling having the shape of the casing to be produced, and held between the mould and segments forming the counter-mould in such a way as to obtain a fibrous preform.

Once the fibrous preform is produced, in other words at the end of the winding of the fibrous web, the tooling carrying the fibrous preform is closed by the counter-moulds then transported to an oven or a furnace in which the densification of the preform by a matrix is carried out, the matrix being able to be obtained, in particular, by injection and polymerisation of a resin in the fibrous preform.

The casings must provide a retention function by containing the debris ingested inside the engine, or the blades or fragments of blades projected by centrifugation, in order to prevent them from a passing completely through the casing and releasing high-energy debris.

In addition, the turbomachine casings are subjected to large vibratory excitations. More specifically, they house the blades which generate, during operation, a strong dynamic excitation due to shocks at the blade tip. It is very important that the casing is capable of handling the dynamic excitation, in particular by preventing vibrational eigenmodes of the casing from being excited and causing an interaction between the rotor and the stator.

It must also be taken into account that the vibratory stresses of the casing and its vibrational eigenmodes can change with wear of the turbomachine. For safety reasons, it is very important that the most energetic eigenmodes of the casing are not excited at any time throughout its service life.

For this purpose, it is possible to have reinforcement regions in order to ensure sufficient mechanical strength of the casing.

However, when the casing is made of composite material the addition of such reinforcement regions requires connecting of the material to the composite structure, which is not easy using current methods.

This is why there remains a need to reinforce casings for which the mechanical strength would not be as good as for the casings of the prior art, and a need to obtain these casings more simply than the casings of the prior art.

DISCLOSURE OF THE INVENTION

The proposed invention aims to address the above problem.

For this purpose, the invention relates to a fibrous web having a strip shape extending in a longitudinal direction over a determined length between a proximal edge and a distal edge, in a lateral direction over a determined width between a first side edge and a second side edge, and in the thickness between an inner face and an outer face, the fibrous web having a three-dimensional or multi-layer weave between a plurality of layers of warp yarns or strands extending in the longitudinal direction and a plurality of layers of weft yarns or strands extending in the lateral direction, the fibrous web comprising a distal portion present between an intermediate part and the distal edge in the longitudinal direction, the distal portion comprising, in the direction of its thickness, an inner portion and an outer portion, disposed such that the inner portion extends between the inner face and the outer portion, and the outer portion extends between the inner portion and the outer face, the web being characterised in that the outer portion is connected to the inner portion by at least one linking portion, the outer portion comprising first and second deployable portions extending in the lateral direction from the linking portion over a determined width, the first deployable portion being separated from the inner portion by a first non-interlinked area, the second deployable portion being separated from the inner portion by a second non-interlinked area.

The fibrous web according to the invention and in particular its two deployable portions can form a casing preform comprising a stiffener on an outer face of the casing preform, and can do so directly due to the fibrous web.

This makes it possible to obtain a casing with improved mechanical properties with respect to vibratory stresses, and avoid any step of adding a stiffener connected during the manufacture of the casing.

In addition, the stiffener is better connected to the remainder of the casing, since it forms an integral part of the latter and it does not require additional attachment or bonding. It is referred to in this case as an integral stiffener.

In an embodiment, the ratio between the thickness of the outer portion and the thickness of the inner portion is between 150% and 260%.

In an embodiment, the ratio between the thickness of the outer portion and the thickness of the inner portion is between 160% and 260%.

In an embodiment, the ratio between the distance from the first side edge to the linking portion and the distance from the second side edge to the linking portion is between 10% and 40%.

This embodiment can ensure that the stiffener, formed by the folding of the deployable portions, is located at a location on the fibrous web, and ultimately on the casing, which enables an increase in the stiffness to mass ratio of the casing, so as to increase the eigenfrequencies which could be obtained in the operating range of the engine.

In an embodiment, the linking portion is obtained by sewing the outer portion on the inner portion, by co-weaving of the inner and outer portions or by needling an outer portion on the inner portion.

The linking portion is indispensable for enabling the textile attachment between the outer portion and the inner portion. The linking portion is present between the non-interlinked parts.

The various textile linking methods considered, all enable this attachment, each providing distinct advantages.

Obtaining the linking portion by sewing makes it possible to add the outer portion as an excess thickness to the distal portion of the reminder of the fibrous web.

This makes it possible to choose the nature of the outer portion very precisely, and to locate the linking portion and the non-interlinked areas very precisely.

Obtaining the linking portion by co-weaving can ensure a very robust attachment of the outer portion with respect to the inner portion. In addition, this enables a fibrous web such as described to be obtained, without the need for an additional step, since the linking portion is created directly during the weaving step of the fibrous web.

Obtaining the linking portion by needling represents a less complex linking step of the outer portion than a sewing step and also does not require the weaving step to be modified with respect to the methods of the prior art.

In an embodiment, the distal portion comprises a plurality of linking portions, connecting the outer and inner parts.

In an embodiment, the distal portion comprises, in the direction of the width, an upstream area, an intermediate area and a downstream area, disposed such that the upstream area extends between the first side edge and the intermediate area, the intermediate area extends between the upstream area and the downstream area, and the downstream area extends between the intermediate area and the second side edge, the intermediate area comprising all the linking portions and wherein the intermediate area comprises weft and/or warp yarns of a different nature from the other yarns of the fibrous web.

This embodiment makes it possible to choose yarns of a different nature for the regions intended to form the deployable portions of the fibrous web, and thus to optimise the specific properties of this characteristic region of the fibrous web.

In an embodiment, the yarns of the outer part of the intermediate area are of a different nature, while the remainder of the yarns of the distal portion are identical to the yarns of the remainder of the fibrous web.

In an embodiment, the yarns of the fibrous web are chosen from carbon strands with intermediate modulus (300 GPa, for example HexTow® IM7 type carbon fibres, marketed by HEXCEL) and the intermediate area comprises weft and/or warp yarns made of carbon with high modulus (450 GPa, for example HexTow® HM63 type carbon fibres, marketed by HEXCEL). In this embodiment, the stiffness of the stiffener is thus maximised. More specifically, since the stiffness of a beam is a function of the Young's modulus, cross-section and length, increasing the modulus amounts to increasing the stiffness. This pushes the eigenfrequency towards high frequencies because it is a function of the stiffness divided by the mass—the latter being unchanged.

In an embodiment, the inner and outer portions are non-interlinked over distances of between 90% and 98% of the width of the web.

This embodiment makes it possible to obtain deployable portions of a satisfactory length in order to ensure a further improved stiffening function.

In an embodiment, the first and second deployable portion extend in the lateral direction from the linking portion over a width between 1% and 5% of the width of the fibrous web.

The above was described in relation to the distal portion of the fibrous web.

In an embodiment, it is possible to give the fibrous web additional properties by adjusting the proximal portion of the fibrous web.

In an embodiment, the fibrous web comprises a proximal portion between the proximal edge and an intermediate part in the longitudinal direction, the proximal portion comprising in the direction of its thickness, an inner proximal portion and an outer proximal portion, disposed such that the inner proximal portion extends between the inner face and the outer proximal portion, and the outer proximal portion extends between the inner proximal portion and the outer face, wherein the outer proximal portion is connected to the inner proximal portion by at least one proximal linking portion, the outer proximal portion comprising first and second proximal deployable portions extending in the lateral direction from the proximal linking portion over a determined width, the first proximal deployable portion being separated from the inner proximal portion by a first proximal non-interlinked area, the second proximal deployable portion being separated from the inner proximal portion by a second proximal non-interlinked area.

The fibrous web according to the invention and in particular its two proximal deployable portions can form a casing preform comprising an attachment flange on the inner face of the casing preform, and can do so directly due to the fibrous web.

This makes it possible to obtain a casing for which the connection to other elements is largely simplified compared with existing casings.

The attachment flange is thus much better connected to the rest of the casing then the metal-composite attachment points of the casings of the prior art, since it is an integral part of the fibrous web of the casing.

In an embodiment, the ratio between the thickness of the outer proximal portion and the thickness of the inner proximal portion is between 50% and 170%.

In an embodiment, the ratio between the distance from the first side edge to the proximal linking portion and the distance from the second side edge to the proximal linking portion is between 10% and 30%.

This embodiment can ensure that the attachment flange, formed by folding the proximal deployable portions, is located in a location on the fibrous web, and ultimately on the casing, which enables the attachment of other elements to the casing in a simplified manner.

In an embodiment, the proximal linking portion is obtained by sewing the inner portion on the outer portion, by co-weaving of the inner and outer portions or by needling a proximal inner portion on the proximal outer portion.

The proximal linking portion is indispensable for enabling the textile attachment between the inner proximal portion and the outer proximal portion. The proximal linking portion is present between the non-interlinked parts.

The various textile linking methods considered, all enable this attachment, each providing distinct advantages.

Obtaining the proximal linking portion by sewing makes it possible to add the inner proximal portion as an excess thickness of the proximal portion of the reminder of the fibrous web.

This makes it possible to choose the nature of the proximal outer portion very precisely, and to locate the proximal linking portion and the proximal non-interlinked areas very precisely.

Obtaining the proximal linking portion by co-weaving can ensure a very robust attachment of the proximal inner portion with respect to the proximal outer portion. In addition, this enables a fibrous web such as described to be obtained, without the need for an additional step, since the proximal linking portion is created directly during the weaving step of the fibrous web.

Obtaining the proximal linking portion by needling represents a less complex linking step of the inner portion than a sewing step and also does not require the weaving step to be modified with respect to the methods of the prior art.

In an embodiment, the proximal portion comprises a plurality of proximal linking portions connecting the inner and outer proximal parts.

In an embodiment, the proximal portion comprises, in the direction of the width, a proximal upstream area, a proximal intermediate area and a proximal downstream area, disposed such that the proximal upstream area extends between the first side edge and the proximal intermediate area, the proximal intermediate area extends between the proximal upstream area and the proximal downstream area, and the proximal downstream area extends between the proximal intermediate area and the second side edge, the proximal intermediate area comprising all the proximal linking portions and wherein the proximal intermediate area comprises weft and/or warp yarns of a different nature from the other yarns of the fibrous web.

This embodiment makes it possible to choose yarns of a different nature for the regions intended to form the proximal deployable portions of the fibrous web, and thus to optimise the specific properties of this characteristic region of the fibrous web.

In an embodiment, the yarns of the proximal inner part of the proximal intermediate area are of a different nature, while the remainder of the yarns of the proximal portion are identical to the yarns of the remainder of the fibrous web.

In an embodiment, the yarns of the fibrous web are chosen from carbon fibres with intermediate modulus of order 300 GPa, such as HewTow® IM7 fibres marketed by HEXCEL and the proximal intermediate area comprises weft and/or warp yarns made of carbon fibres of high modulus of order 450 GPa such as HewTow® HM63 fibres marketed by HEXCEL). In this embodiment, the stiffness of this area is maximised. By increasing the stiffness of this area and therefore ultimately of the attachment flange, the mechanical robustness thereof is increased.

In an embodiment, the proximal inner and outer portions are non-interlinked over distances of between 95% and 99% of the width of the web.

This embodiment makes it possible to obtain proximal deployable portions of a sufficient length to form an attachment flange with the desired mechanical properties.

In an embodiment, the first and second proximal deployable portion extend in the lateral direction from the linking portion over a width between 2% and 5% of the width of the fibrous web.

According to another of its aspects, the invention relates to an aeronautical casing fibrous preform comprising a winding of one or more turns of a fibrous web as described above, the inner face of the proximal edge of the web being located on the side of a radially inner face of the preform, and the outer face of the distal edge of the web being located on the side of a radially outer face of the preform.

In an embodiment, the intermediate part of the fibrous web is chosen so as to correspond to the start of the last turn of the winding which has just been described.

In this embodiment, the stiffener formed by the deployable portions of the fibrous web is present over the entire outer circumference of the casing.

According to another of its aspects, the invention relates to a method for manufacturing a composite material aeronautical casing comprising at least the following steps:

disposing a fibrous preform as just described around a cylindrical mandrel;

disposing at least one counter-mould on the radially outer part of the fibrous preform, said counter-mould comprising at least one first and one second counter-mould part, a deployable portion of the fibrous web being present between the first and the second counter-mould part;

forming the matrix in the fibrous web held between the mandrel and the counter-mould.

In such an embodiment, the aeronautical casing is manufactured directly with a stiffener.

In other words, it is not necessary to connect a stiffener to the casing, the stiffener being created directly during the formation of the matrix in the fibrous web, and more precisely in the deployable portions of the fibrous web.

In addition, the counter-mould comprises a geometry adapted to the deployable portion.

In an embodiment where the fibrous web comprises a plurality of linking portions, the counter-mould may comprise more than two parts such that each stiffener, in other words such that the two deployable portions formed by a linking portion, are present between two distinct counter-mould parts.

These distinct counter-mould parts enable easier demoulding of the casing, once the matrix is formed.

In an embodiment, the matrix is organic such as epoxy resin, for example PR 520N RTM resin marketed by Solvay S.A.

According to another of its aspects, the invention relates to a composite material gas turbine casing comprising a fibrous reinforcement composed of a fibrous preform such as described above, and a matrix densifying the fibrous reinforcement.

Such an embodiment makes possible a gas turbine casing, the stiffeners of which are manufactured directly during formation of the casing, enabling the mechanical characteristics of the casing to be improved without needing to add stiffeners on an already formed casing.

The casings according to the invention are therefore less complex to manufacture than the casings of the prior art, and the stiffeners are more reliably attached to them.

According to another of its aspects, the invention relates to an aeronautical gas turbine engine comprising a casing such as described above.

BRIEF DESCRIPTION OF THE DRAWINGS

FIG. 1 schematically represents a loom, possibly used for the manufacture of a fibrous web according to the invention.

FIG. 2 represents a fibrous web in an embodiment of the invention.

FIG. 3 represents a fibrous web in a different embodiment of the invention from that of FIG. 2.

FIG. 4 schematically represents a sectional view of a fibrous web in an embodiment of the invention.

FIG. 5 schematically represents a deployment operation of deployable portions of a web, according to an embodiment of the invention.

FIG. 6 schematically represents a fibrous web described in FIG. 2, in which the deployable portions have been deployed.

FIG. 7 schematically represents a fibrous web described in FIG. 3, in which the deployable portions have been deployed.

FIG. 8 schematically represents the obtaining of a fibrous casing preform from a fibrous web.

FIG. 9 represents a particular sectional view of FIG. 8.

FIG. 10 schematically represents the disposition of a fibrous preform ready to be impregnated in an embodiment of the invention.

FIG. 11 schematically represents a turbomachine casing in an embodiment of the invention.

FIG. 12 schematically represents a turbomachine in an embodiment of the invention.

FIG. 13 schematically represents a fibrous web in an embodiment of the invention.

FIG. 14 schematically represents a fibrous web in an embodiment of the invention.

DESCRIPTION OF THE EMBODIMENTS

The invention is now described by means of figures, having the descriptive aim of illustrating certain embodiments of the invention and which must not be interpreted as limiting the latter.

In particular, the figures are not to scale, nor even to relative scale, and merely serve to illustrate the embodiments described below.

As shown in FIG. 1, a fibrous web is produced in known manner by weaving using a Jacquard loom 5 on which a bundle of warp yarns or strands 20 is disposed in a plurality of layers, the warp yarns being linked by weft yarns or strands 30.

In FIG. 1, the weft yarns 30 are represented in the lateral direction Y, and the warp yarns 20 in the longitudinal direction X.

It should be noted however that the term "weft yarns" or "warp yarns" are only naming conventions, and that it is possible to reverse, here and in the remainder of the application, the occurrences of "weft" by "warp" and vice-versa.

FIG. 2 represents a fibrous web 500 in an embodiment of the invention.

The fibrous web 500 has a strip shape extending in a longitudinal direction X over a determined length $L_{100}$ between a proximal edge 103 and a distal edge 104, in a lateral direction Y over a determined width $l_{100}$ between a first side edge 101 and a second side edge 102, and in the thickness Z between an inner face $F_{int}$ and an outer face $F_{ext}$.

The fibrous web has a three-dimensional or multi-layer weave between a plurality of layers of warp yarns or strands 20 extending in the longitudinal direction X and a plurality of layers of weft yarns or strands 30 extending in the lateral direction Y, the fibrous web 500 comprising a distal portion $P_{dist}$ present between an intermediate part $PI_2$ and the distal part 104, the distal portion $P_{dist}$ comprising, in the direction of its thickness Z, an inner portion $PD_{int}$ and an outer portion $PD_{ext}$, disposed such that the inner portion $PD_{int}$ extends between the inner face $F_{int}$ and the outer portion $PD_{ext}$, and the outer portion $PD_{ext}$ extends between the inner portion $PD_{int}$ and the outer face $F_{ext}$, the web 500 comprising at least two non-interlinked areas 421, 422 between the inner portion $PD_{int}$ and the outer portion $PD_{ext}$, and in that it further comprises a linking portion 419 linking the inner portion $PD_{int}$ to the outer portion $PD_{ext}$, such that the non-interlinking parts 441, 442 of the outer portion $PD_{ext}$ form deployable portions of the fibrous web around the linking portion 419.

In the embodiment represented, the intermediate part $PI_2$ starts at starting point 460 of the distal portion.

In an embodiment, the starting point of the distal portion 460 could correspond to the departure point of the last turn of a casing preform, as will be described in connection with FIG. 10.

In order to facilitate the description of the web 500, FIG. 2 shows a fibrous web having only one linking portion 419, but it should be understood that this embodiment is not limiting for the invention.

The web 500 comprises, in the distal part $P_{dist}$ an upstream area 410, an intermediate area 420 and a downstream area 430, disposed such that the upstream area 410 extends between the first side edge 101 and the intermediate area 420, the intermediate area 420 extends between the upstream area 410 and the downstream area 430, and the downstream area 430 extends between the intermediate area 420 and the second side edge 102.

For example, the width 1410 of the upstream area 410 can be between 10% and 70% of the width 1100 of the web 500 depending on the desired axial position for the stiffener.

For example, the width 1420 of the intermediate area 420 can be between 2% and 10% of the width 1100 of the web 500 depending on the axial position and the desired height for the stiffener.

For example, the width 1430 of the downstream area 430 can be between 30% and 85% of the width 1100 of the web 500 depending on the desired axial position for the stiffener.

In an embodiment, and as shown in FIG. 2, the widths $l_{410}$ and $l_{430}$ may not be equal.

The web 500 further comprises, in the distal part $P_{dist}$ an inner portion $PD_{int}$ and an outer portion $PD_{ext}$, respectively on the side of the inner face $F_{int}$ and of the outer face $F_{ext}$, which makes it possible to define six areas of the fibrous web visible in FIG. 2. The upstream inner portion 471, the downstream outer portion 444, the intermediate inner area, the intermediate outer area, the downstream inner portion 472 and the downstream outer portion 445.

The intermediate area 420 is itself divided into smaller areas by the linking portion 419 and the two non-interlinked areas 421, 422.

Thus, the intermediate area 420 comprises an inner portion part 453 linked to the outer portion part 443 by the linking portion 419 and two parts of the inner portion 451 and 452 which are non-interlinked with parts located directly above and in the outer portion 441 and 442 and separated from these by the non-interlinked areas 421 and 422.

In the case of a three-dimensional or multi-layer weave, as in the example described here, a part is referred to as "non-interlinked" with another when no weft or warp yarn forms a textile link between the two non-interlinked parts, even though the two parts were previously linked together, in other words the non-interlinked area is formed during the weaving. The two parts are therefore said to be separated by a non-interlinked area.

In the present invention, a part is also said to be "non-interlinked" with another, in the general case where there is no textile link between the two parts, in other words when one of these two parts is added after weaving. If a portion of the added part is linked to the other part, for example by needling, over a linking area, the remainder of the added part (outside the linking area) will be said to be non-interlinked with the other part.

Part 451 is separated from part 441 by the non-interlinked area 421, and part 452 is separated from part 442 by the non-interlinked area 422.

In an embodiment, the non-interlinked area 421 can extend beyond the intermediate area 420, for example as shown in FIG. 2, up to the first outer edge 101.

In an embodiment, the upstream inner portion 471 and the downstream outer portion 444 are non-interlinked by the non-interlinked area 415 extending the non-interlinked area 421.

In an embodiment, the non-interlinked area 422 can extend beyond the intermediate area 420, for example as shown in FIG. 2, up to the second outer edge 102.

In an embodiment, the downstream inner portion 472 and the downstream outer portion 445 are non-interlinked by the non-interlinked area 417 extending the non-interlinked area 422.

In an embodiment, the non-interlinked areas 421 and 422 thus define the deployable portions 442 and 441.

FIG. 2 also includes a frame IV corresponding to the section which will be presented in FIG. 4.

In the embodiment described in FIG. 2, the outer part $PD_{ext}$ is disposed in the thickness of the web, in other words the web 500 has no thickness variation at the starting point 460 of the distal portion $P_{dist}$.

In an embodiment, the thickness of the outer portion $e_{Dext}$ can be between 60% and 72% of the total thickness $e_{100}$ of the web 500.

FIG. 3 shows an alternative embodiment of a web 500.

FIG. 3 is similar to FIG. 2, except that the inner portion $PD_{int}$ of the distal portion $P_{dist}$ corresponds to the extension of the remainder of the fibrous web. In other words, the outer portion $PD_{ext}$ is disposed as an excess thickness of the inner portion $PD_{int}$, and the inner portion $PD_{int}$ has a thickness equal to the thickness $e_{100}$ of the remainder of the web 500, in other words the portion of the web extending between the proximal edge 103 and the point 460.

In this embodiment, the thickness of the outer portion $e_{Dext}$ can be between 150% and 260% of the total thickness $e_{100}$ of the web 500.

In an embodiment, the thickness variation of the fibrous web 500 can be progressive from the starting point of the distal portion 460, for example over a length of 15 cm on either side of the point 460.

In an embodiment, the outer part of the distal portion $PD_{ext}$ is added on the inner part of the distal portion $PD_{int}$.

For example, the outer part $PD_{ext}$ is added after creation of the remainder of the web and attached on the inner part $PD_{int}$ by the linking portion 419, carried out for example by sewing or needling.

This embodiment makes it possible to avoid any complex operation for creating a non-interlinked area at the time of weaving since, in effect, if the outer part $PD_{ext}$ is attached to the web after its creation, it is non-interlinked with it by definition, except at the attachment points.

In addition, this makes it possible to specifically choose the fibres constituting the outer part $PD_{ext}$ for example as of a different nature from the remainder of the fibrous web, and this in order to ensure better mechanical properties, for example.

FIG. 4 illustrates the distal portion $P_{dist}$ in more detail, in a sectional view identified by the frame IV in FIG. 3.

The distal part $P_{dist}$ comprises an outer part $PD_{ext}$ and an inner part $PD_{int}$, identified in FIG. 4. Between the two inner edges, there are also upstream 410, intermediate 420 and downstream 430 areas.

FIG. 4 also shows the upstream inner portion 471, the downstream outer portion 444, the intermediate inner area (451, 452 and 453), the intermediate outer area (441, 442 and 443), the downstream inner portion 472 and the downstream outer portion 445.

FIG. 4 further distinctly shows the warp yarns 20 and the weft yarns 602, 603, 606.

The weft yarns are identified in FIG. 4 by a plurality of numerical references according to their configurations with respect to the warp yarns 20.

In an embodiment, the weft yarns 602 of the inner portion $PD_{int}$ weave the warp yarns 20 of the inner portion $PD_{int}$ in a three-dimensional weave.

Here, the term "three-dimensional weaving" or "3D weaving" shall mean a weaving method by which at least some warp yarns link weft yarns over a plurality of weft layers, for example an "interlock weave". The term "interlock weaving" shall mean a type of three-dimensional weaving, in which each warp layer binds a plurality of weft layers, with all the yarns of the same warp column having the same movement in the weave plane.

This makes it possible, in particular, to have a weaving of the weft yarns that is identical to the remainder of the fibrous web.

In an embodiment, which is represented in FIG. 4, the weft yarns 606 of the outer portion $PD_{ext}$, can be non-linking in the downstream outer portion 444 and downstream outer portion 445.

More specifically, since they are separated from the upstream inner 471 and downstream inner 472 portions by the non-interlinked areas 415 and 417, and since they do not necessarily form part of the deployable portions 441 and 442, the yarns of the upstream outer 444 and downstream outer 445 portions are intended to be cut, and it is not necessary to weave them.

For example, the cuts 501 and 502 could be made at the limit of the intermediate area 420. The result of these cuts will be described in conjunction with FIG. 5, which will present a detailed view of the frame identified by the symbol V in FIG. 4.

In an embodiment, the weft yarns of parts 441, 442 and 443 of the outer portion $PD_{ext}$ of the intermediate area 420 form a three-dimensional weaving with the warp yarns.

This makes it possible to obtain deployable portions 441 and 442 which have excellent properties and very good strength.

In addition, FIG. 4 shows details of the weaving in the intermediate area 420. In an embodiment which is that represented, the area 441 (respectively 442) is non-interlinked with area 451 (respectively 452), and this due to the fact of the non-interlinked area 421 (respectively 422) extending the non-interlinked area 415 (respectively 417).

More specifically, none of the weft yarns of the intermediate outer area 441 (or 442) is linked to a warp yarn of the intermediate inner area 451 (or 452).

On the contrary, at the linking portion 419, the weft yarns of the intermediate outer area 443 are linked to the warp yarns of the intermediate inner area 453. The weaving 603 is represented here schematically, but it can be understood that a linking portion 419 is thus formed, ending at the non-interlinked areas 421 and 422.

The linking portion 419 is represented here as a co-weaving of the yarns 603 passing through the linking portion 419, but the particular effect of the linking portion 419 comprising weft yarns of portion 443 with warp yarns of portion 453 can be obtained by other textile methods, in particular needling or sewing.

The effect of this linking portion 419 is described in detail with the description of FIG. 5.

FIG. 5 represents the intermediate area 420. More precisely, it shows the step of deploying the deployable portions 441 and 442.

Due to the non-interlinked areas 421 and 422, the deployable portions 441 and 442 can be deployed around the linking portion 419. Thus, a web is formed with more complex geometry than the initial web.

FIG. 5 shows the deployable portions 441 and 442 after cuts 501 and 502 have been made.

In an embodiment, the length of the deployable portions is chosen as a function of the stiffening characteristics that it is desired to obtain according to the purpose of the fibrous web.

For example, if the web is intended to form an aeronautical casing preform, the deployable portions could have a length between 1.8×n×R and 2.2×n×R, R being the radius of the outer skin of the casing.

In other words, the deployable portions could have a length between 90% and 110% of the length of the outer skin of the casing.

The cuts 501 and 502 thus mark the ends of the deployable portions 441 and 442. For example, the cuts 501 and 502 are made over the entire length of the distal part $P_{dist}$, over a thickness corresponding to the thickness $e_{Dext}$ of the outer part $PD_{ext}$.

In other embodiments, and, in particular, when there is more of a linking portion, the deployable portions can extend up to the first inner edge 101, or to the second inner edge 102, without requiring a cut.

However, other cuts can be produced in the intermediate area 420 and between two linking portions, in order to form deployable portions.

FIG. 6 represents the fibrous web obtained after carrying out the operations of cutting and deployment of the deployable portions 441 and 442.

FIG. 6 corresponds more precisely to a fibrous web of FIG. 2, after all the shaping operations of the deployable portions 441 and 442.

In particular, it will be noted that at the point 460 where the distal part $P_{dist}$ of the fibrous web starts, a reduction in thickness 461 is observed.

More specifically, with respect to the initial fibrous web, that of FIG. 2, the outer upstream 444 and downstream 445 portions have been removed.

Since these counted in the thickness of the distal part $P_{dist}$ of the fibrous web, the distal part $P_{dist}$ is less thick once the upstream 444 and downstream 445 outer portions have been removed.

The distal part $P_{dist}$ after deployment of the deployable portions, therefore only comprises the inner portion $PD_{int}$ consisting of areas 471, 451, 453, 452 and 472 described above.

In an embodiment, the deployable portions 441 and 442 together form a stiffener 480.

The stiffener 480 is held on the assembly of the remainder of the fibrous web by the linking portion 419.

The remainder of the fibrous web remains identical to that which was described above.

In an alternative embodiment, shown in FIG. 7, the stiffener 480 can be formed without reducing the thickness of the web at the starting point 460 of the distal part $P_{dist}$.

This is the case, in particular, when the inner portion $PD_{int}$ of the fibrous web has a similar thickness to the remainder of the fibrous web, for example that shown in FIG. 3, in an embodiment where the outer portion $PD_{ext}$ is added on the inner portion $PD_{int}$ by sewing or needling.

In any of event, the deployment of the deployable portions 441 and 442 enables the stiffener 480 to be formed.

FIG. 8 illustrates a step of disposing a fibrous web 500 as described above on a mould 50 with a view to forming a turbomachine casing preform.

The mould 50 may comprise a mandrel 710 having the shape of the casing to be formed.

FIG. 8 illustrates a fibrous casing reinforcement which is formed by winding the previously described fibrous web 500 onto a mould 50, the fibrous reinforcement constituting a complete tubular fibrous preform of a casing forming a single piece. In particular, the disposition of the distal portion of a web 500 on the mandrel 710 can be seen here.

The mould 50 comprises a mandrel 710, having an outer surface 51, the profile of which corresponds to the inner surface of the casing to be produced.

The inner face $F_{int}$ of the web 500 is disposed on the outer surface 51 of the mandrel 710, and the web 500 is then wound from its proximal edge 103 to its distal edge 104.

In FIG. 8, two arrows symbolise the rotation of the mandrel 710 to be carried out in order to form the web. Of course, the web can also be disposed while leaving the mandrel fixed.

The mandrel 710 also comprises two rims 52 and 53 for forming the ends of the fibrous preform corresponding to the flanges of the casing, the downstream flange 62 and the upstream flange 63 respectively.

The fibrous preform portions corresponding to the flanges 62, 63 of the casing end with the second side edge 102 and the first side edge 101 respectively.

FIG. 9 represents a section of the fibrous web deposited on the mould 50 visualised by frame IX in FIG. 8.

The mould 50 comprises the mandrel 710 and further comprises a first counter-mould part 721 and a second counter-mould part 722.

FIG. 9 illustrates the particular case of a web comprising only one linking portion 419, and consequently only having one stiffener 480, but it should be understood that it would be possible to treat textures comprising a plurality of linking portions, and therefore a plurality of stiffeners, in a similar manner.

In the embodiment illustrated in FIG. 9, the first counter-mould part 721 can shape the casing portion extending between the first side edge 101 and the stiffener 480, while the second counter-mould part 722 can shape the casing portion extending between the stiffener 480 and the second side edge 102.

In addition, the separation of the counter-mould into two parts 721, 722 ensures easy demoulding from the mould without the risk of damaging the stiffener 480.

FIG. 10 illustrates the winding of a fibrous web 500 on a mandrel 710 from another point of view.

The fibrous web 500 is wound on the mandrel starting from its proximal edge 103, the inner face $F_{int}$ of the web being disposed on the outer face 51 of the mandrel 710. The winding gives rise to a plurality of turns of the web in order to form the preform up to the disposition of the distal part $P_{dist}$, as shown in FIG. 10.

In the embodiment shown, the distal part $P_{dist}$ starts at the point 460, which represents the start of the last turn of the fibrous web on the mandrel 710.

This embodiment ensures that the stiffener 480 formed by the deployable portions 441, 442 of the distal part $P_{dist}$ of the web 500 is present over the entire last turn, and ultimately over the entire circumference of the casing.

In an alternative embodiment, it may be preferred to only have a stiffener 480 on part of the circumference of the casing, and for this it is sufficient to dispose the point 460 closer to the distal edge 104.

The mandrel 710 represented in FIG. 10 also has the counter-mould 721 opposite it.

In this case, the counter-mould 721 comprises a plurality of counter-mould sectors (all referenced as 721) and together forming a counter-mould 721 for the entire circumference of the mandrel 710.

For example, once the fibrous web 500 is disposed on the mandrel 710 in order to form a turbomachine casing fibrous preform, the preform can then be densified by a matrix.

The densification of the fibrous preform consists of filling the pores of the preform, in all or part of the volume thereof, with the material constituting the matrix.

The matrix can be obtained in a manner that is known per se, according to the liquid method. The liquid method involves impregnating the preform with a liquid composition containing an organic precursor of the matrix material. The organic precursor usually has the form of a polymer, such as a resin, optionally diluted in a solvent. The fibrous preform is placed in a mould that can be closed in a sealed manner with a recess having the shape of the moulded final part. As illustrated in FIG. 10, here the fibrous preform is placed between a plurality of sectors 721 and 722 forming the counter-mould and the mandrel 710 forming a support, these elements respectively having the outer shape and the inner shape of the casing to be produced. Then, the matrix precursor liquid, for example a resin, is injected into all of the recess in order to impregnate the preform.

The transformation of the precursor into organic matrix, i.e. its polymerisation, is carried out by heat treatment, generally by heating the mould, after removal of any solvent and cross-linking of the polymer, the preform always being kept in the mould having a shape corresponding to that of the part to be produced. The organic matrix can be of obtained, in particular from epoxy resins such as, for example, commercially-available high-performance epoxy resins, or from liquid precursors of carbon or ceramic matrices.

In the case of the formation of a carbon or ceramic matrix, the heat treatment consists of pyrolysing the organic precursor in order to transform the organic matrix into a carbon or ceramic matrix depending on the precursor used and the pyrolysis conditions. By way of example, carbon liquid precursors can be resins with relatively high coke content, such as phenolic resins, while the ceramic liquid precursors, in particular of SiC, can be polycarbosilane (PCS) or polytitanocarbosilane (PTCS) or polysilazane (PSZ) resins. Several consecutive cycles can be carried out from the impregnation up to the heat treatment, in order to achieve the desired degree of densification.

The densification of the fibrous preform can be performed by the well-known method of resin transfer moulding (RTM). According to the RTM method, the fibrous preform is placed in a mould having the shape of the casing of be produced. A thermosetting resin is injected into the internal space defined between the part made of rigid material and the mould, and which comprises the fibrous preform. A pressure gradient is generally established in this internal space between the location where the resin is injected and the orifices for removal thereof, in order to control and optimise the impregnation of the preform by the resin.

The resin used can be, for example, an epoxy resin. The resins suitable for RTM methods are well-known. They preferably have a low viscosity in order to facilitate their injection into the fibres. The choice of the temperature class and/or the chemical nature of the resin is determined as a function of the thermomechanical stresses to which the part must be subjected. Once the resin is injected into the entire reinforcement, its polymerisation proceeds by heat treatment according to the RTM method.

After injection and polymerisation, the part is demoulded. Finally, the part is trimmed in order to remove excess resin and the chamfers are machined in order to obtain a casing 1010 represented in FIG. 11.

The casing 1010 is a casing for an aeronautical gas turbine engine fan. The casing further comprises a stiffener 480 formed by the densification of the deployable portions 441 and 442 described above.

In addition, the casing comprises an upstream flange 1001 and a downstream flange 1002, formed by the fibrous preform portions 62 and 63 described above.

FIG. 12 illustrates an aeronautical engine comprising a casing 1010 as described.

Such an engine, as shown highly schematically in FIG. 12, comprises, from upstream to downstream in the direction of flow of a gaseous stream, a fan 81 disposed at the intake of the engine, a compressor 82, a combustion chamber 83, a high-pressure turbine 84 and a low-pressure turbine 85. The engine is housed inside a casing comprising a plurality of parts corresponding to various elements of the engine. Thus, the fan 81 is surrounded by the casing 1010. In addition, and as shown in FIG. 12, the casing 1010 comprises a stiffener 480.

The above description has been given in relation to the distal part $P_{dist}$ of the fibrous web.

In a particular embodiment of the present invention, the fibrous web used for the present invention may comprise a particular proximal part which can directly form a flange on the inner portion of the casing, during manufacture of the casing.

The following relates to a particular embodiment of a fibrous web proximal part, the embodiments of which can be independently combined with the embodiments described above for the distal part.

FIG. 13 illustrates such an embodiment.

FIG. 13 illustrates a fibrous web 900 for which the proximal and distal portions comprise non-interlinked areas, but on opposite faces.

As has been described above, the fibrous web can then form turbomachine casings comprising one or more attachment flanges on their internal circumferences and one or more stiffeners on their outer circumferences.

FIG. 13 thus illustrates a distal portion $P_{dist}$ as described above, for which the deployable portions form a stiffener 480 on the outer face $F_{ext}$.

Symmetrically, the proximal part $P_{prox}$ of the fibrous web comprises a flange 180 formed by one or more deployable proximal portions formed in the proximal portion $P_{prox}$ on the inner face $F_{int}$.

The proximal portion extends between an intermediate area $PI_1$ and the proximal edge 103.

FIG. 14 illustrates a particular proximal portion for achieving a fibrous web of the FIG. 13.

That which follows, and only that which follows, is described in order to particularise the proximal part of a fibrous web. If, by symmetry, the terms already used above for the distal part have been reused without the proximal or distal adjective, it should be understood that in that which follows relates to the proximal part.

FIG. 14 only illustrates the proximal portion $P_{prox}$ but it should be understood that the distal part, which is not particularly particularised in FIG. 14 for reasons of legibility, conforms with a distal part such as described above, for example in connection with FIG. 2 or 3.

In FIG. 14, the fibrous web has a strip shape extending in a longitudinal direction X over a determined length $L_{100}$ between a proximal part 103 and a distal part 104, in a lateral direction Y over a determined width $I_{100}$ between a first side edge 101 and a second side edge 102, and in the thickness Z between an inner face $F_{int}$ and an outer face $F_{ext}$.

The fibrous web has a three-dimensional or multi-layer weave between a plurality of layers of warp yarns or strands 20 extending in the longitudinal direction X and a plurality of layers of weft yarns or strands 30 extending in the lateral direction Y, the fibrous web comprising a proximal portion $P_{prox}$ present between an intermediate part $PI_1$ and the distal part 104, the proximal portion $P_{prox}$ comprising, in the direction of its thickness Z, a proximal inner portion $PP_{int}$ and a proximal outer portion $PP_{ext}$, disposed such that the proximal inner portion $PP_{int}$ extends between the inner face $F_{int}$ and the proximal outer portion $PP_{ext}$, and the proximal outer portion $PP_{ext}$ extends between the proximal inner portion $PP_{int}$ and the outer face $F_{ext}$, the web comprising at least two proximal non-interlinked areas 121, 122 between the proximal inner portion $PP_{int}$ and the proximal outer portion $PP_{ext}$, and in that it further comprises a proximal linking portion 119 linking the proximal inner portion $PP_{int}$ to the proximal outer portion $PP_{ext}$, such that the non-interlinking parts 141, 142 of the proximal inner portion $PP_{int}$ form deployable proximal portions of the fibrous web around the proximal linking portion 119.

In the embodiment represented, the intermediate part $PI_1$ starts at end point 160 of the proximal portion $P_{prox}$.

In an embodiment, the point 160 could correspond to the end point of the first turn of a casing preform, of a preform formed as represented in FIG. 10.

In order to facilitate the description of the web, a fibrous web having only a proximal linking portion 119 is presented in FIG. 14, but it should be understood that this embodiment is not limiting.

The web comprises, in the proximal part $P_{dist}$ a proximal upstream area 110, a proximal intermediate area 120 and a proximal downstream area 130, disposed such that the proximal upstream area 110 extends between the first side edge 101 and the proximal intermediate area 120, the proximal intermediate area 120 extends between the proximal upstream area 110 and the proximal downstream area 130, and the downstream area 130 extends between the proximal intermediate area 120 and the second side edge 102.

For example, the width $I_{110}$ of the proximal upstream area 110 can be between 5% and 90% of the width $I_{100}$ of the web depending on the desired axial position for the attachment flange.

For example, the width $I_{120}$ of the proximal intermediate area 120 can be between 2% and 10% of the width 1100 of the web depending on the desired axial position for the attachment flange.

For example, the width $I_{130}$ of the proximal downstream area 130 can be between 5% and 90% of the width $I_{100}$ of the web depending on the desired axial position for the attachment flange.

In particular, and thus as shown in FIG. 2, the widths $I_{110}$ and $I_{130}$ may not be equal.

The web further comprises, in the proximal part $P_{prox}$, a proximal inner portion $PP_{int}$ and a proximal outer portion $PP_{ext}$ which make it possible to define six areas of the fibrous web that can be seen in FIG. 2. The proximal downstream outer portion 171, the proximal upstream inner portion 144, the proximal intermediate inner area, the proximal intermediate outer area, the proximal downstream outer portion 172 and the proximal downstream inner portion 145.

The proximal intermediate area 120 is itself divided by the proximal linking portion 119 and the two proximal non-interlinked areas 121, 122.

Thus, the proximal intermediate area 120 comprises a proximal outer portion part 153 linked to the proximal inner portion part 143 by the proximal linking portion 119 and two parts of the outer proximal portion 151 and 152 which are non-interlinked with parts located directly below and in the proximal inner portion 141 and 142.

Part 151 is separated from the proximal part 141 by the non-interlinked area 121 and part 152 is separated from part 142 by the non-interlinked area 122.

In an embodiment, the non-interlinked area 121 can extend beyond the proximal intermediate area 120, for example as shown in FIG. 2, up to the first outer edge 101.

In an embodiment, the proximal upstream outer portion 171 and the proximal upstream inner portion 144 are not interlinked by the non-interlinked area 115 extending the non-interlinked area 121.

In an embodiment, the non-interlinked area 122 can extend beyond the proximal intermediate area 420, for example as shown in FIG. 2, up to the second outer edge 102.

In an embodiment, the proximal downstream outer portion 172 and the proximal downstream inner portion 145 are non-interlinked through the non-interlinked area 117 extending the non-interlinked area 122.

In an embodiment, the non-interlinked areas 121 and 122 thus define the deployable portions 142 and 141.

In the embodiment described in FIG. 2, the proximal inner part $PP_{int}$ IS disposed in the thickness of the web, in other words the web has no thickness variation at the end point 160 of the proximal portion $P_{prox}$.

In an embodiment, the thickness of the proximal inner portion $e_{Pint}$ can be between 30% and 60% of the total thickness $e_{100}$ of the web.

In an embodiment that is not shown, the proximal inner part $PP_{int}$ can be added on the fibrous web.

The proximal deployable portions 142 and 141 can form the flange 180 in a manner analogous to the manner in which the distal deployable portions form the stiffener 480, and as has been described in connection with FIGS. 4 and 5.

Such a proximal portion may require adjustments to the impregnation method described above in connection with FIGS. 8 to 11.

Below, the particular case is described of a web comprising only a proximal linking portion 119, and consequently not having a flange 180, but it should be understood that it would be possible to treat textures comprising a plurality of proximal linking portions, and therefore a plurality of flanges, in a similar manner.

Due to the presence of the flange 480 on the inner face $F_{int}$ of the fibrous preform, the mould 710 can therefore be broken down into two parts.

In this embodiment and in a manner analogous to the counter-mould broken down into two parts 721 and 722, the first mould part can shape the casing portion extending between the first side edge 101 and the flange 180, while the second mould part can shape the casing portion extending between the flange 180 and the second side edge 102.

In addition, the separation of the mould in to two parts ensures easy demoulding from the mould without the risk of damaging the flange 180.

The invention claimed is:

1. An aeronautical casing fibrous preform comprising a winding of one or more turns of a fibrous web having a strip shape extending in a longitudinal direction over a determined length between a proximal edge and a distal edge, in a lateral direction over a determined width between a first side edge and a second side edge, and in the thickness between an inner face and an outer face, the fibrous web having a three-dimensional or multi-layer weave between a plurality of layers of warp yarns or strands extending in the longitudinal direction and a plurality of layers of weft yarns or strands extending in the lateral direction, the fibrous web comprising a distal portion present between an intermediate part and the distal edge in the longitudinal direction, the distal portion comprising, in the direction of its thickness, an inner portion and an outer portion, disposed such that the inner portion extends between the inner face and the outer portion, and the outer portion extends between the inner portion and the outer face, wherein the outer portion is connected to the inner portion by at least one linking portion, the outer portion comprising first and second deployable portions extending in the lateral direction from the linking portion over a determined width, the first deployable portion being separated from the inner portion by a first non-interlinked area, the second deployable portion being separated from the inner portion by a second non-interlinked area, the inner face of the proximal edge of the web being located on the side of a radially inner face of the preform, and the outer face of the distal edge of the web being located on the side of a radially outer face of the preform.

2. The aeronautical casing fibrous preform according to claim 1, wherein the ratio between the thickness of the outer portion and the thickness of the inner portion is between 160% and 260%.

3. The aeronautical casing fibrous preform according to claim 1, wherein the ratio between the distance from the first side edge to the linking portion and the distance from the second side edge to the linking portion is between 10% and 40%.

4. The aeronautical casing fibrous preform according to claim 1, wherein the linking portion is obtained by sewing the outer portion on the inner portion, by co-weaving of the inner and outer portions or by needling an outer portion on the inner portion.

5. The aeronautical casing fibrous preform according to claim 1, wherein the distal portion comprises, in the direction of the width, an upstream area, an intermediate area and a downstream area, disposed such that the upstream area extends between the first side edge and the intermediate area, the intermediate area extends between the upstream area and the downstream area, and the downstream area extends between the intermediate area and the second side edge, the intermediate area comprising all the linking portions and wherein the intermediate area comprises weft and/or warp yarns of a different nature from the other yarns of the fibrous web.

6. The aeronautical casing fibrous preform according to claim 5, wherein the yarns of the fibrous web are chosen from carbon strands with intermediate modulus and wherein the intermediate area comprises weft and/or warp carbon yarns of high modulus.

7. The aeronautical casing fibrous preform according to claim 1, wherein the first and second deployable portions extend in the lateral direction from the linking portion over a width between 1% and 5% of the width of the fibrous web.

8. The aeronautical casing fibrous preform according to claim 1, wherein the fibrous web further comprises a proximal portion present between the proximal edge and an intermediate part in the longitudinal direction, the proximal portion comprising, in the direction of its thickness, an inner proximal portion and an outer proximal portion, disposed such that the inner proximal portion extends between the inner face and the outer proximal portion, and the outer proximal portion extends between the inner proximal portion and the outer face, wherein the outer proximal portion is connected to the inner proximal portion by at least one proximal linking portion, the outer proximal portion comprising first and second proximal deployable portions extending in the lateral direction from the proximal linking portion over a determined width, the first proximal deployable portion being separated from the inner proximal portion by a first proximal non-interlinked area, the second proximal deployable portion being separated from the inner proximal portion by a second proximal non-interlinked area.

9. A method for manufacturing an aeronautical casing made of a composite material comprising:

disposing a fibrous preform according to claim 1 around a cylindrical mandrel;

disposing at least one counter-mould on the radially outer part of the fibrous preform, said counter-mould comprising at least one first and one second counter-mould part, a deployable portion of the fibrous web being present between the first and the second counter-mould part;

forming the matrix in the fibrous web held between the mandrel and the counter-mould.

10. A gas turbine casing made of composite material, comprising a fibrous reinforcement composed of a fibrous preform according to claim 1 and a matrix densifying the fibrous reinforcement.

11. A gas turbine aeronautical engine comprising a casing according to claim 10.

* * * * *